United States Patent
Kumagai et al.

(10) Patent No.: US 10,343,569 B2
(45) Date of Patent: Jul. 9, 2019

(54) SEAT FOR VEHICLES

(71) Applicant: TACHI-S CO., LTD., Akishima-shi, Tokyo (JP)

(72) Inventors: Kotaro Kumagai, Tokyo (JP); Atsushi Ishii, Tokyo (JP); Atsushi Koike, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 295 days.

(21) Appl. No.: 15/302,982

(22) PCT Filed: Mar. 23, 2015

(86) PCT No.: PCT/JP2015/058788
§ 371 (c)(1),
(2) Date: Oct. 7, 2016

(87) PCT Pub. No.: WO2015/156109
PCT Pub. Date: Oct. 15, 2015

(65) Prior Publication Data
US 2017/0028889 A1 Feb. 2, 2017

(30) Foreign Application Priority Data
Apr. 9, 2014 (JP) .................................. 2014-080178

(51) Int. Cl.
*B60N 2/62* (2006.01)
*B60N 2/64* (2006.01)
*B60N 2/80* (2018.01)

(52) U.S. Cl.
CPC .............. *B60N 2/646* (2013.01); *B60N 2/62* (2013.01); *B60N 2/80* (2018.02)

(58) Field of Classification Search
CPC . B60N 2/62; B60N 2/646; B60N 2/80; B60N 2/986
(Continued)

(56) References Cited

U.S. PATENT DOCUMENTS 5,317,773 A * 6/1994 Graebe ................... A47C 4/54
5/653
2001/0013146 A1 8/2001 Wempe
2013/0060282 A1 3/2013 Pham

FOREIGN PATENT DOCUMENTS

JP 11-198701 A 7/1999
JP 11-342775 A 12/1999
(Continued)

OTHER PUBLICATIONS

International Search Report from International Patent Application No. PCT/JP2015/058788, dated Jun. 9, 2015.
(Continued)

*Primary Examiner* — Milton Nelson, Jr.
(74) *Attorney, Agent, or Firm* — Shapiro, Gabor and Rosenberger, PLLC

(57) ABSTRACT

Provided is a seat for vehicles that improves holding properties during seating without providing more support sections than necessary in a seat cushion, and enables a passenger to smoothly getting on and off the vehicle. The seat for vehicles has a seat cushion that forms the seating surface of the seat, a seat back that forms the backrest of the seat, and a headrest that protects the head and neck of a passenger, in which the seat cushion includes a pelvis holding section that holds the pelvis of the passenger on the rear side of the seat cushion, and thigh holding sections that hold the thighs of the passenger on the front surface side of the right and left side surfaces of the seat cushion, in which the height of the seating surface on the rear side of the seat cushion is lower than the height of the thigh holding sections, and is lower than the height of the pelvis holding section.

15 Claims, 4 Drawing Sheets

(58) Field of Classification Search
USPC .......................... 297/452.25, 452.23, 452.24
See application file for complete search history.

(56) References Cited

FOREIGN PATENT DOCUMENTS

| | | |
|---|---|---|
| JP | 2001-171411 A | 6/2001 |
| JP | 2004-306869 A | 11/2004 |
| JP | 2007-167110 A | 7/2007 |
| JP | 2009-262798 A | 11/2009 |

OTHER PUBLICATIONS

Extended European Search Report dated Nov. 24, 2017, in European Patent Application No. EP15776373.1.
Office Action dated Nov. 27, 2017 in Chinese Patent Application No. 201580018689.3.
Office Action dated Dec. 19, 2017, in Japanese Patent Application No. 2014-080178.

* cited by examiner

SEAT FOR VEHICLES

TECHNICAL FIELD

The present invention relates to a seat for vehicles, and more specifically, to a seat for vehicles that improves getting-on and -off properties and holding properties during seating.

BACKGROUND ART

A conventional seat for vehicles, such as a seat for automobiles, includes side supports that mainly hold the thighs of a passenger, so-called seat banks, in the right and left side surfaces of a seat cushion so that the height of the right and left portions of the seat cushion that forms the seating surface of the seat is higher than the height of the center of the seat cushion in order to hold the body of the passenger with respect to the inertial force in the right-left direction during running.

Consequently, an operation of passing over the side supports provided on the right and left sides of the seat cushion when the passenger gets on and off the vehicle is required, resulting in deteriorating getting-on and -off properties. In addition, in the posture in which the outer leg is put out of the vehicle during getting on and off the vehicle, the leg is difficult to reach the ground outside the vehicle because the right and left portions of the seat cushion are high due to the side supports.

To address such problems, the seat for vehicles, such as the seat for automobiles, is being developed to enable smooth getting on and off the vehicle while ensuring holding properties during seating.

As a background art of this technical field, there is a technique in Patent Literature 1. Patent Literature 1 discloses a seat for vehicles in which a side support is provided in the side portion of a seat body, the seat for vehicles including a cloth-like member that encloses the side support, and a winding device that can wind and unwind the cloth-like member, in which the cloth-like member is wound by the winding device to press and lower the side support, and the cloth-like member is unwound to release the pressing with respect to the side support.

As another background art of this technical field, there is a technique in Patent Literature 2. Patent Literature 2 describes a seat for vehicles that includes a seat cushion and a seat back, the seat cushion being mounted so as to be turnable about a horizontal axis with respect to a vehicle floor, in which the seat cushion includes a main body that forms the seating portion of a passenger, and a bank body mounted via a hinge in at least the side portion on the outer side of both side portions of the main body, in which the bank body is turned so as to be ridged with respect to the main body so that the seating state of the passenger can be supported, in which the seat cushion includes a raising and lowering mechanism that turns the bank body on the outer side downwardly from the ridged state when the seat cushion is turned above a predetermined angle from the front to the outer side.

CITATION LIST

Patent Literature

PTL 1: Japanese Patent Application Laid-Open Publication No. 2007-167110
PTL 2: Japanese Patent Application Laid-Open Publication No. 2009-262798

SUMMARY OF INVENTION

Technical Problem

When as described above, the height of the side support is increased to improve holding properties during seating, getting-on and -off properties are deteriorated. In addition, when more support sections than necessary are provided to improve holding properties, the weight of the seat cushion is increased to increase the weight of the vehicle itself.

The seat for vehicles in Patent Literature 1 can cope with holding properties and getting-on and -off properties for the passenger regardless of the presence or absence of side support frames. In addition, the seat for vehicles in Patent Literature 2 can improve getting-on and -off properties of the vehicle even when it has supporting properties in the seating state.

In both of Patent Literatures 1 and 2, getting-on and -off properties are not deteriorated even when the side support or the so-called seat bank is provided in the seat cushion, but the side support or the so-called seat bank is equivalent to conventional ones, and holding properties thereof are the same as conventional seats for vehicles. In addition, in both of Patent Literatures 1 and 2, the driving mechanism is required, resulting in maintenance and cost demerits.

Accordingly, an object of the present invention is to provide a seat for vehicles that improves holding properties during seating without providing more support sections than necessary in a seat cushion, and enables a passenger to smoothly getting on and off the vehicle.

Solution to Problem

The present invention provides a seat for vehicles having a seat cushion that forms the seating surface of the seat, a seat back that forms the backrest of the seat, and a headrest that protects the head and neck of a passenger, in which the seat cushion includes a pelvis holding section that holds the pelvis of the passenger on the rear side of the seat cushion, and thigh holding sections that hold the thighs of the passenger on the front surface side of the right and left side surfaces of the seat cushion, in which the height of the seating surface on the rear side of the seat cushion is lower than the height of the thigh holding sections, and is lower than the height of the pelvis holding section.

The present invention provides a seat for vehicles having a seat cushion that forms the seating surface of the seat, a seat back that forms the backrest of the seat, and a headrest that protects the head and neck of a passenger, in which the seat cushion includes a pelvis holding section that holds the pelvis of the passenger on the rear side of the seat cushion, and thigh holding sections that hold the thighs of the passenger in the right and left side surfaces of the seat cushion, in which the thigh holding sections are provided on the front surface side of the right and left side surfaces of the seat cushion, in which the thigh holding sections are not substantially provided on the rear side of the right and left side surfaces of the seat cushion.

Advantageous Effects of Invention

According to one aspect of the present invention, the seat for vehicles improves holding properties during seating without providing more support sections than necessary in the seat cushion, and enables the passenger to smoothly getting on and off the vehicle.

Other problems, configurations, and effects will be apparent from the description of the following embodiment.

DESCRIPTION OF EMBODIMENTS

An example of the present invention will now be described with reference to the drawings.

EXAMPLE 1

Figure 1:
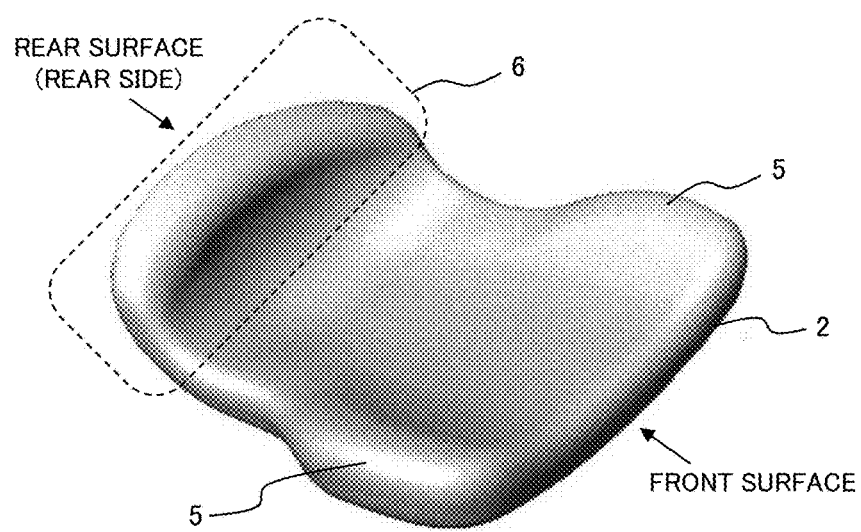
FIG. 1 is a diagram illustrating a seat cushion of a seat for vehicles according to one embodiment of the present invention.
Figure 6:
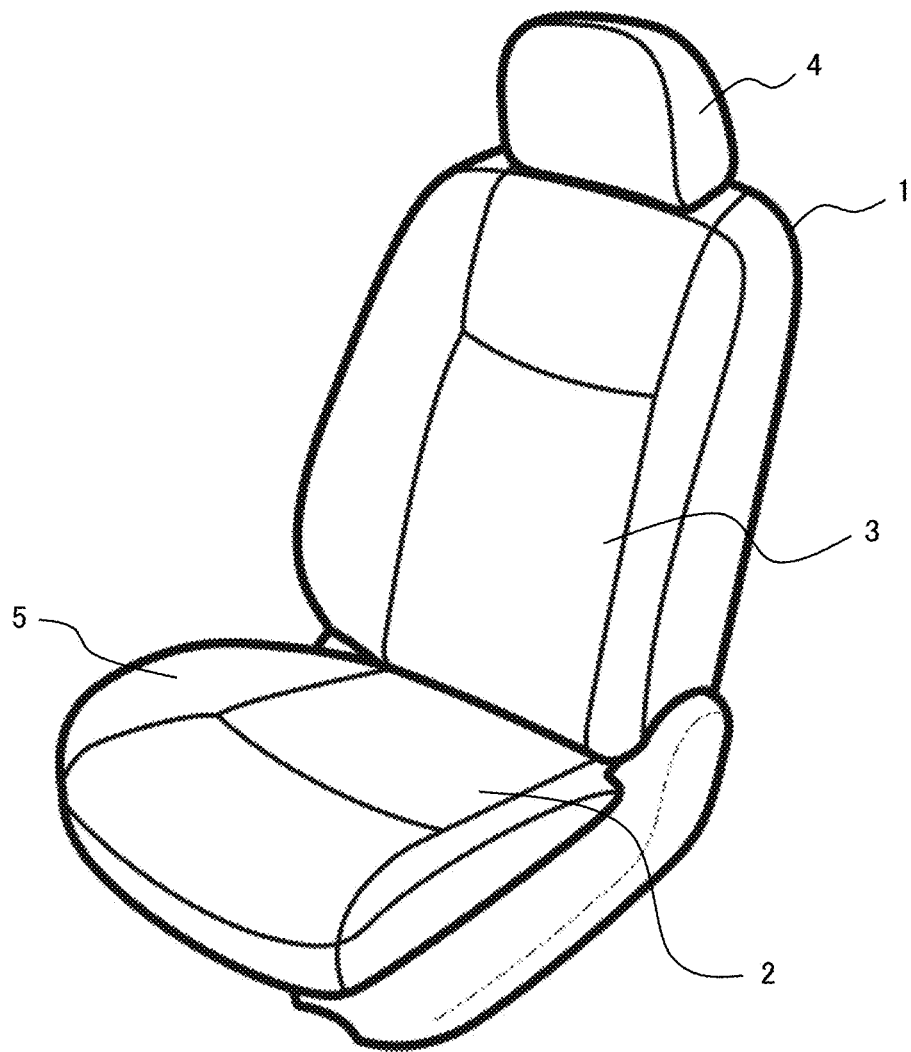
FIG. 6 is a diagram illustrating the overview of a typical seat for vehicles.

FIG. 1 illustrates a seat cushion of a seat for vehicles used in an automobile according to one example of the present invention. The seat for vehicles according to this example has substantially the same configuration as a typical seat for vehicles illustrated in FIG. 6, except for a seat cushion 2 and side supports 5. First, referring to FIG. 6, the configuration of the typical seat for vehicles will be described. A seat for vehicles 1 has, as its main sections, the seat cushion 2 that forms the seating surface of the seat, a seat back 3 that forms the backrest of the seat, and a headrest 4 that protects the head and neck of a passenger. In the right and left side surfaces of the seat cushion 2, the side supports 5 that form the supports of the side portions of the seating surface, or so-called banks, are provided.

Figure 4:
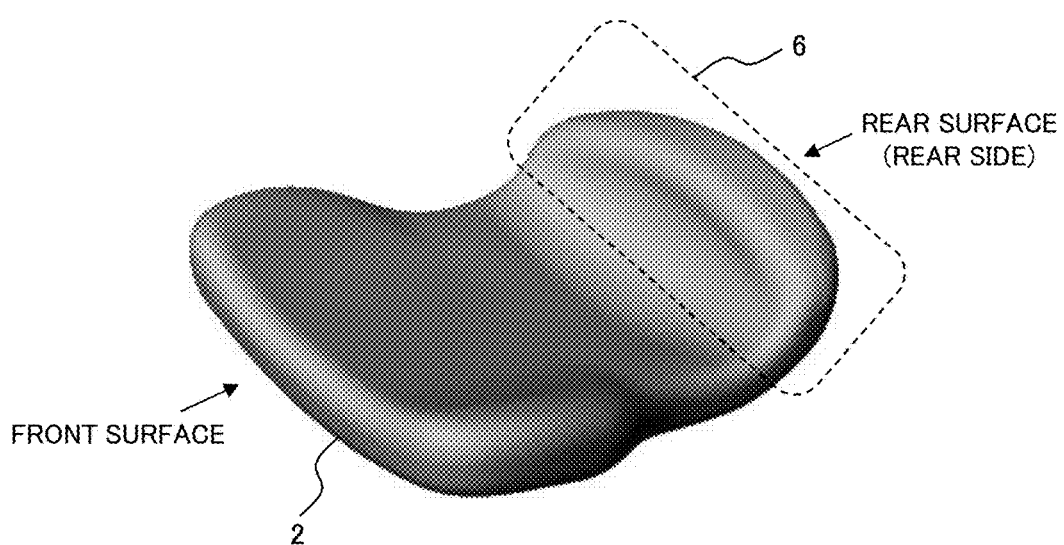
FIG. 4 is a diagram illustrating a seat cushion of a seat for vehicles according to one embodiment of the present invention.
Figure 5:
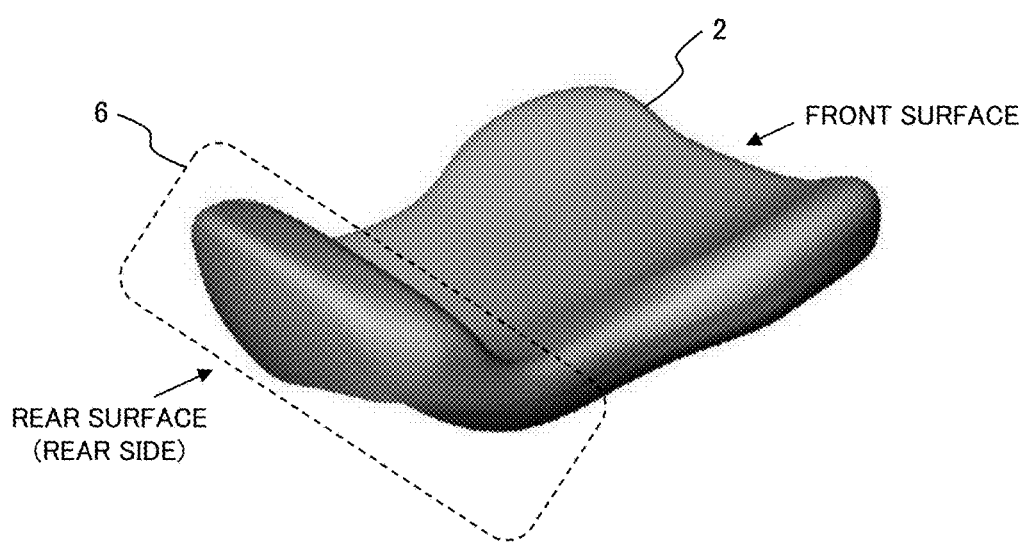
FIG. 5 is a diagram illustrating a seat cushion of a seat for vehicles according to one embodiment of the present invention.

Referring to FIG. 1, the seat cushion 2 and the side supports 5 according to this example will be described. In FIGS. 4 and 5, the seat cushion 2 in FIG. 1 is seen from different directions. In addition, the seat cushion 2 is formed of a cushion material that mainly includes urethane or a fiber pad.

As illustrated in FIG. 1, the seat cushion 2 according to this example has a pelvis holding section 6 that mainly holds the pelvis of the passenger on the rear surface, that is, on the rear side, of the seat cushion 2. More specifically, on the rear side of the seat cushion 2, the pelvis holding section 6 is provided so as to extend from the right and left side surfaces of the seat cushion 2 along the rear side of the seat cushion 2.

In addition, thigh holding sections, that is, the side supports 5, are provided on the front surface side of the right and left side surfaces of the seat cushion 2. The side supports 5 hold the thighs of the passenger during seating. Here, as illustrated in FIG. 1, in the right and left side surfaces of the seat cushion 2 sandwiched between the pelvis holding section 6 and the side supports 5, that is, on the rear side of the right and left side surfaces of the seat cushion 2, the side supports provided on the front surface side are not provided.

Here, the height of the seating surface on the rear side of the seat cushion 2 is lower than the height of the thigh holding sections, that is, the side supports 5, and is lower than the height of the pelvis holding section 6.

As seen from FIG. 1, the right and left side surfaces of the seat cushion 2 sandwiched between the pelvis holding section 6 and the side supports 5, that is, the right and left side surfaces on the rear side of the seat cushion 2, are slightly higher than the center of the seating surface of the seat cushion 2, but do not have the supporting function that holds the body of the passenger with respect to the inertial force in the right-left direction during running of the vehicle, that is, the side supports 5 provided on the front surface side of the right and left side surfaces of the seat cushion 2. That is, the thigh holding sections are not substantially provided on the rear side of the right and left side surfaces of the seat cushion 2.

Further, in the seat cushion 2 according to this example, the seating surface of the seat cushion 2 has a smooth incline from the front surface side of the seat cushion 2 toward the pelvis holding section 6, and has a round-shaped dent that holds the hips (mainly, the pelvis) of the passenger near the pelvis holding section 6. That is, the seating surface of the seat cushion 2 has a round shape along a human body.

As illustrated in FIG. 1, preferably, in the seating surface of the seat cushion 2, there are no sewing portions in the seat cover or the sewing portions therein are minimized, thereby providing the smooth incline. This improves comfortability of the passenger during seating, and enables the passenger to easily get on and off the vehicle.

The seating surface of the seat cushion 2 has a smooth incline from the right and left side surfaces of the seat cushion 2 toward the center of the seat cushion 2. As illustrated in FIG. 1, preferably, in the inclined surface, there are no sewing portions in the seat cover or the sewing portions therein are minimized, thereby providing the smooth incline. This improves comfortability of the passenger during seating, and enables the passenger to easily get on and off the vehicle.

Figure 2:
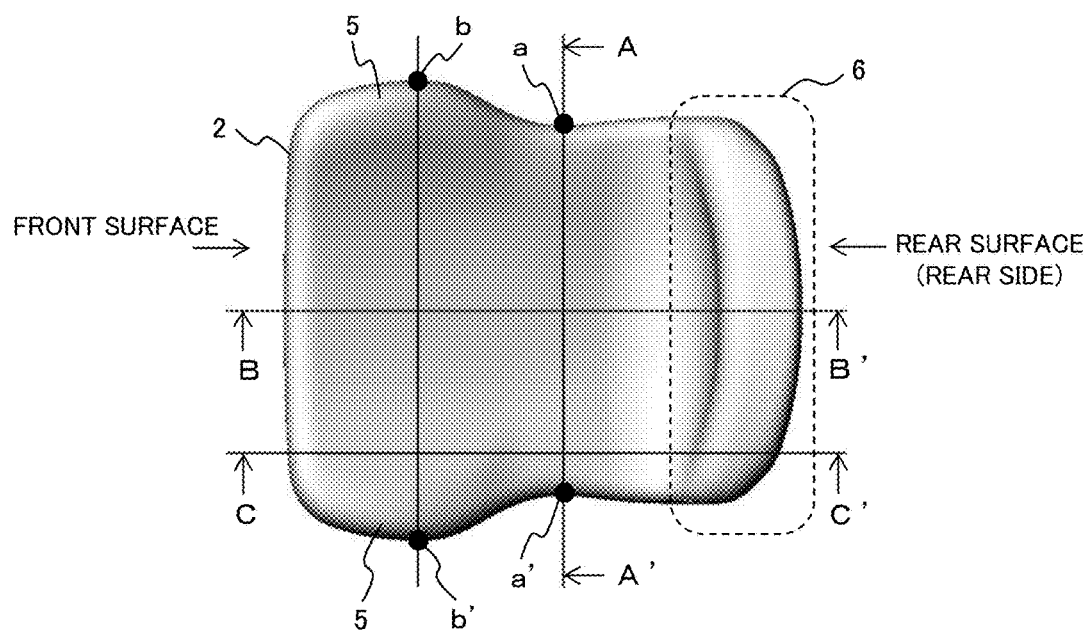
FIG. 2 is a diagram illustrating a seat cushion of a seat for vehicles according to one embodiment of the present invention.
Figure 3A:
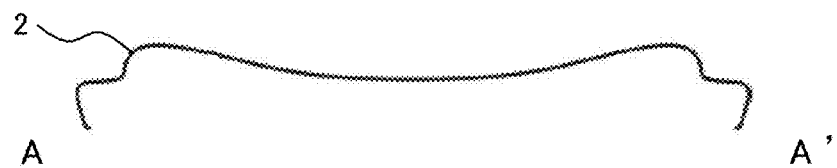
FIG. 3A is a diagram illustrating a partial cross section of a seat for vehicles according to one embodiment of the present invention.
Figure 3B:
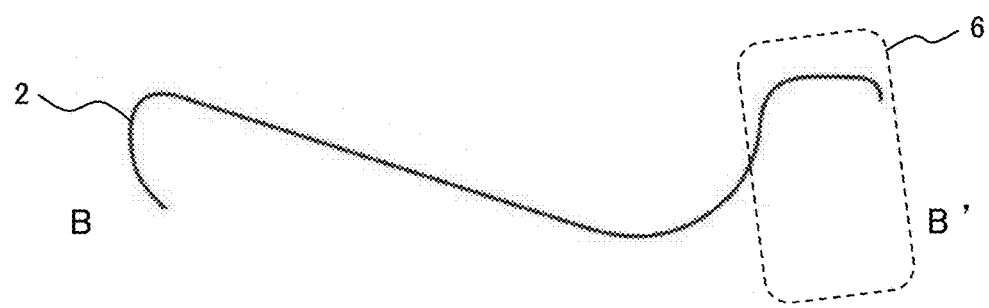
FIG. 3B is a diagram illustrating a partial cross section of a seat for vehicles according to one embodiment of the present invention.
Figure 3C:
FIG. 3C is a diagram illustrating a partial cross section of a seat for vehicles according to one embodiment of the present invention.

Referring to FIGS. 2 to 3C, a more specific shape of the seat cushion 2 according to this example will be described. FIG. 2 illustrates a plan view (top view) of the seat cushion 2 in FIG. 1. In addition, FIGS. 3A to 3C respectively illustrate a cross section taken along line A-A', a cross section taken along line B-B', and a cross section taken along line C-C'.

As described above, in the seat cushion 2 according to this example, the pelvis holding section 6 is provided so as to extend from the right and left side surfaces of the seat cushion 2 along the rear side of the seat cushion 2. In addition, as seen from FIGS. 3B and 3C, the seat cushion 2 has a smooth incline in the seating surface of the seat cushion 2 from the front surface side of the seat cushion 2 toward the pelvis holding section 6, and has a round-shaped dent that holds the hips (mainly, the pelvis) of the passenger near the pelvis holding section 6.

In addition, as seen from FIGS. 2 to 3C, the round-shaped dent provided in the seating surface of the seat cushion 2 is provided so as to have a smooth incline from the right and left side surfaces of the seat cushion 2 toward the center of the seat cushion 2.

Here, the height of the pelvis holding section 6 in FIG. 3C, that is, the height of the pelvis holding section 6 near the right and left side surfaces of the seat cushion 2, is lower than the height of the pelvis holding section 6 in FIG. 3B, that is, the height of the pelvis holding section 6 near the center of the round-shaped dent provided in the seat cushion 2. By providing the round-shaped dent in the seat cushion 2, the stability of the hips (mainly, the pelvis) of the passenger is increased during seating, so that the height of the pelvis holding section 6 near the right and left side surfaces of the seat cushion 2 can be low. Thus, as compared with the provision of the seat the pelvis holding section 6 at the same height on the entire rear side of the seat cushion 2, the pelvis holding section 6 can be provided without making the weight of the pelvis holding section 6 larger than necessary.

Further, as seen from FIG. 2, the width on the rear side of the seating surface of the seat cushion 2, that is, the length between a-a', is shorter than the width on the front surface side of the seating surface of the seat cushion 2 including the thigh holding sections provided on the front surface side of the right and left side surfaces of the seat cushion 2, that is, the side supports 5, that is, the length between b-b'. That is, the seat cushion 2 has a width narrowing portion in the seating surface between the regions having the side supports 5 and the pelvis holding portion 6 in the seating surface. The width narrowing portion is on the front surface side from the pelvis holding section 6 of the seat cushion 2, and substantially corresponds to the position rearwardly of the bases of the thighs of the passenger.

In this way, the side supports 5 are provided on the front surface side of the right and left side surfaces of the seat cushion 2, and are not substantially provided on the rear side of the right and left side surfaces of the seat cushion 2. Thus, as compared with the typical seat for vehicles in which the side supports are provided in all of the right and left side surfaces of the seat cushion 2, the thighs of the passenger during seating can be held without providing more support sections than necessary in the seat cushion 2.

In addition, by the above configuration, in the posture in which the outer leg is put out of the vehicle during getting on and off the vehicle, the outer leg can be put out of the vehicle from the rear side of the right and left side surfaces of the seat cushion 2 not having the side supports, so that the leg can easily reach the ground outside the vehicle. This enables smooth getting on and off the vehicle.

Further, since more support sections are not provided than necessary in the seat cushion 2, the weight of the seat cushion can be minimized without deteriorating the body holding properties of the seat for vehicles.

As described above, according to the seat for vehicles using the seat cushion according to this example, by providing the pelvis holding section holding the pelvis of the passenger in the seat cushion, holding properties during seating can be improved.

Since the seat cushion has the round shape that holds the hips of the passenger, the hips of the passenger can be held more stably, thereby improving holding properties during seating.

By holding the thighs of the passenger by a minimum number of side supports, holding properties for the passenger can be improved without providing more support sections than necessary in the seat cushion, so that the seat for vehicles enables smooth getting on and off the vehicle.

As described above, the number of side supports provided in the seat cushion 2 can be minimized. Thus, the weight of the seat cushion 2 can be reduced, thereby reducing the weight of the seat for vehicles and the weight of the vehicle, such as an automobile.

As illustrated in FIG. 3A, steps are provided on the rear side of the right and left side surfaces of the seat cushion 2. Thus, the weight of the seat cushion 2 can be further reduced.

The pelvis holding section 6 may be provided so as to extend in the entire surface on the rear side of the seat cushion 2, and can also be provided so as to be divided into a plurality of portions on the rear side of the seat cushion 2. For example, the pelvis holding section 6 provided on the rear side of the seat cushion 2 is provided so as to extend from the right and left side surfaces of the seat cushion 2 toward the center on the rear side along the rear side of the seat cushion 2, so that the pelvis holding section 6 is not provided near the center on the rear side of the seat cushion 2. This can hold the hips (mainly, the pelvis) of the passenger without making the weight of the pelvis holding section 6 provided in the seat cushion 2 larger than necessary.

A dent or cutaway is provided near the center of the seating surface on the front surface side of the seat cushion 2, that is, in the seating surface between the thighs of the passenger. Thus, the weight of the seat cushion 2 can be further reduced.

As described above, the narrow width portion is provided in the seat cushion 2, and the thigh holding sections are not substantially provided in the narrow width portion. Thus, the leg can easily reach the ground during getting on and off the vehicle to enable the passenger to smoothly getting on and off the vehicle.

The present invention is not limited to the above examples, and includes various modifications. For example, the above examples have been described in detail for clearly understanding the present invention, and do not always include all the above configurations. In addition, part of the configuration of one of the examples can be replaced with the configuration of the other examples. Further, the configuration of one of the examples can be added with the configuration of the other examples. Furthermore, part of the configuration of each example can be added with, deleted from, and replaced with the configuration of the other examples.

REFERENCE SIGNS LIST

1 . . . seat for vehicles,
2 . . . seat cushion,
3 . . . seat back,
4 . . . headrest,
5 . . . side support,
6 . . . pelvis holding section.

The invention claimed is:

1. In an automotive vehicle, a seat for an occupant of the vehicle, the seat comprising:
   a seat cushion that forms a seating surface of the seat;
   a seat back that forms a backrest of the seat; and
   a headrest that protects a head and neck of the occupant,
   wherein the seat cushion includes:
   a pelvis holding section that holds the pelvis of the occupant on a rear side of the seat cushion; and
   right and left side surfaces having forward portions formed with thigh holding side support sections that hold the thighs of the occupant, and rearward portions disposed between the forward portions and the pelvis holding section and formed substantially without thigh holding side support sections, wherein the height of the seating surface on the rear side of the seat cushion is lower than a height of the thigh holding sections, and is lower than the height of the pelvis holding section.

2. The seat according to claim 1, wherein the width of the seating surface on the rear side of the seat cushion is less than the width of the seating surface on the front surface side of the seat cushion including the thigh holding sections.

3. The seat according to claim 1, wherein the seating surface of the seat cushion has a smooth incline from the front surface side of the seat cushion toward the pelvis holding section, and has a round-shaped dent that holds the hips of the passenger near the pelvis holding section.

4. The seat according to claim 1, wherein the seating surface of the seat cushion has a smooth incline from the right and left side surfaces of the seat cushion toward the center of the seat cushion.

5. The seat according to claim 1, wherein the pelvis holding section is provided so as to extend from the right and left side surfaces on the rear side of the seat cushion along the rear side of the seat cushion.

6. The seat according to claim 1, wherein the pelvis holding section is provided so as to be divided into a plurality of portions on the rear side of the seat cushion.

7. The seat according to claim 1, a dent is provided near the center of the seating surface on the front surface side of the seat cushion.

8. The seat according to claim 1, wherein steps are provided on the rear side of the right and left side surfaces of the seat cushion.

9. The seat according to claim 1, wherein the cushion material of the seat cushion is urethane or a fiber pad.

10. The seat according to claim 1, wherein a width of the seating surface at the rearward portions of the right and left side surfaces is smaller than a width of the seating surface at a portion nearer to the pelvis holding section and smaller than a width of the seating surface at a portion having the thigh holding side support sections.

11. The seat according to claim 1, wherein, as viewed in a front-to-back direction, a front portion of the seating surface having the thigh holding side support sections defines only one concave seating zone, the seating zone extending between left and right sides of the seating surface.

12. A seat for vehicles, comprising:
a seat cushion that forms a seating surface of the seat;
a seat back that forms a backrest of the seat; and
a headrest that protects a head and neck of an occupant of the seat,
wherein the seat cushion includes a pelvis holding section that holds the pelvis of the occupant on a rear side of the seat cushion,
wherein the seating surface has a first portion disposed toward a front side of the seat cushion, and a second portion disposed between the first portion and the pelvis holding section,
wherein the second portion of the seating surface is of narrowed width relative to a portion of the seating surface closer to the pelvis holding section and relative to the first portion of the seating surface, and
wherein the seat cushion is configured to provide lateral side support to the thighs of the occupant at the first portion but not at the second portion, the lateral side support being provided by thigh holding sections of the seat cushion.

13. The seat according to claim 12, wherein the height of the seating surface on the rear side of the seat cushion is lower than a height of the thigh holding sections, and is lower than the height of the pelvis holding section.

14. The seat according to claim 12, wherein, as viewed in a front-to-back direction, the first portion of the seating surface defines only one concave seating zone, the seating zone extending between left and right sides of the seating surface.

15. The seat according to claim 12 incorporated into an automotive vehicle.

* * * * *